A. P. LEE.
JAR OR BOTTLE STOPPER.
APPLICATION FILED JUNE 26, 1908.
914,960.
Patented Mar. 9, 1909.
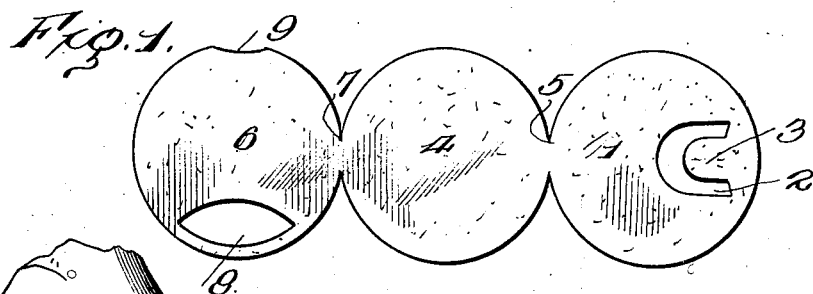
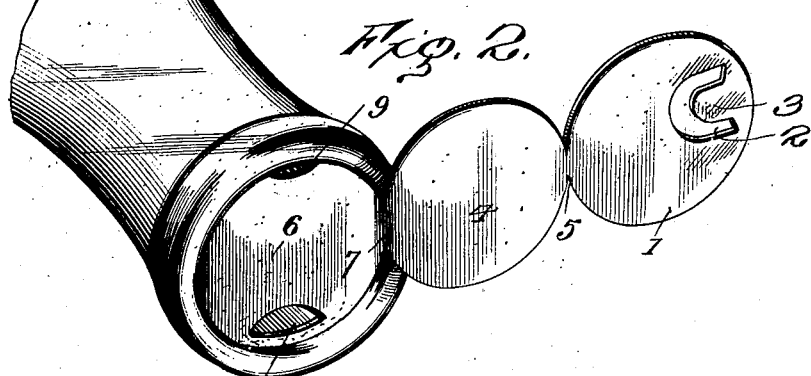
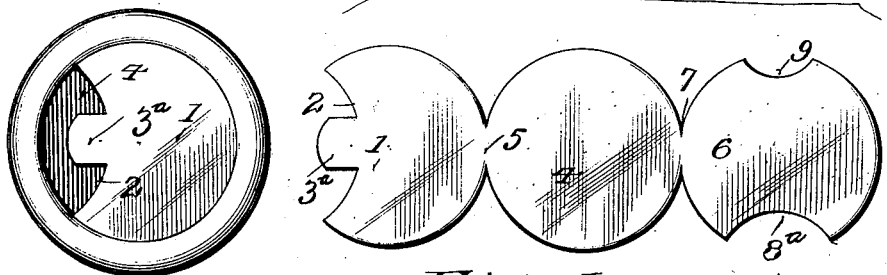
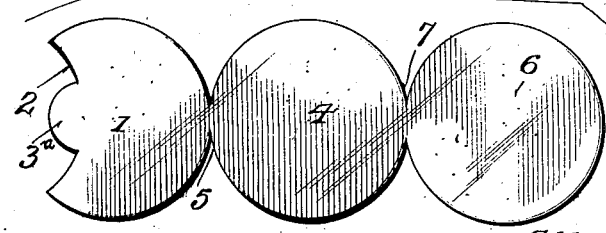
Witnesses
W. A. Williams
Francis S. Maguire
Inventor
Albert P. Lee.
By Lewis F. Lindal
Attorney

UNITED STATES PATENT OFFICE.

ALBERT P. LEE, OF BUFFALO, NEW YORK, ASSIGNOR TO GROVER & LEE COMPANY, OF BUFFALO, NEW YORK, A CORPORATION OF NEW YORK.

JAR OR BOTTLE STOPPER.

No. 914,960.   Specification of Letters Patent.   Patented March 9, 1909.

Application filed June 26, 1908. Serial No. 440,523.

*To all whom it may concern:*

Be it known that I, ALBERT P. LEE, of Buffalo, in the county of Erie and State of New York, have invented certain new and useful Improvements in Jar or Bottle Stoppers; and I do hereby declare the following to be a full, clear, and exact description of the invention, such as will enable others skilled in the art to which it appertains to make and use the same.

The primary object of this invention is to provide a disk-stopper for milk jars or bottles which will afford additional security and protection to the contents from storm, rain, or water, and prevent the milk from being injured by contaminating odors, etc.

A further object is to enable the milk to be poured from the jar without the necessity of entirely removing the stopper, thus avoiding all danger of the latter beng soiled and thereby rendered incapable of further use.

The invention will be hereinafter fully set forth and particularly pointed out in the claims.

In the accompanying drawings, Figure 1 is a plan view. Fig. 2 is a view in perspective showing the stopper extended from a jar. Fig. 3 is a plan view of a slight modification. Fig. 4 shows the same form in closed position. Fig. 5 is another modification.

Referring to the drawings, 1 designates the outer disk, a portion of which is cut away, as at 2, to form a tab 3 by which the disk may be extracted from the mouth of a jar or bottle.

4 designates a second disk which is united at 5 to disk 1; while 6 is the inner disk which is united to the second or intermediate disk 4 at the point 7, which is diametrically opposite the point of union between the first and second disks.

If desired the third or inner disk may be truly circular, like the second disk 4, as shown in Fig. 5, but preferably this inner disk is formed with two cut-outs, 8 and 9, so that when the disks 1 and 4 have been withdrawn, but not disconnected from the inner disk, milk may be poured from the jar without the necessity of entirely removing the stopper, the milk being poured through the larger opening 8 and air admitted through the smaller opening 9. If the jar is not entirely emptied, it may be again sealed by folding over and replacing the disks 4 and 1, which not having been disconnected from the jar will not in any way serve to injure the contents thereof, as so often happens where the disks are laid to one side while the jar is in use. If desired the periphery of the outermost disk may be cut away to form the tab $3^a$ as shown in Figs. 3 and 4, and the cut-out $8^a$ may likewise involve the removal of a segment of the periphery of the inner disk. I prefer, however, to preserve as near as possible the circular formation of each disk so that all of them will be securely held in the bottle neck.

Preferably the several disks are covered with paraffin, and their surfaces may be used for advertisements. In the form shown in Fig. 5 the advertisements may appear on five sides, but in the preferred form, wherein the innermost disk is formed with the cutouts, the advertisements can appear only on the outer face of the intermediate disk 4 and on both faces of the disk 1. The disks are cut from one piece of material by means of a die or any suitable machine, and are preferably made from wood pulp, and in covering the faces of the disk with paraffin, the latter, while hot, is allowed to run around the edges of the disk so that a practically solid disk is thereby produced which will afford ample protection to the contents of the jar and render the same air tight.

In practice, in removing the stopper, for the purpose of pouring some of the contents from the jar, the operator grasps the tab of the outer disk and after removing the latter draws with it the intermediate disk 4. These two disks are suspended from the jar while a portion of the contents is being poured through the opening in the innermost disk; whereupon the two disks may be restored. If, however, the jar is to be wholly emptied a further pull on the outer disk will remove the entire stopper.

I claim as my invention:—

1. A stopper for jars or bottles composed of a plurality of circular disks, each disk being connected to an adjacent disk, the connection between intermediate disks being at diametrically opposite points, the outermost disk having a cut-out and a tab within such cut-out.

2. A stopper for jars or bottles composed of a plurality of disks, each disk being connected to another, the innermost disk having a liquid-outlet opening and an air-inlet opening, and the outermost disk having a tab.

3. A stopper for jars or bottles composed of a plurality of disks, each disk being connected to another and all formed from a single blank, the innermost disk having opposite cut-outs, such disk and cut-outs being covered by the outer disks.

4. A stopper for jars or bottles composed of a plurality of disks, each disk being connected to another, the innermost disk having opposite cut-outs, and the outermost disk having a cut-out and a tab within such cut-out.

5. A stopper for jars or bottles composed of a plurality of disks, each disk being connected to another, the innermost disk having an opening near its periphery, and a second opening diametrically opposite the first opening, and the outermost disk having a tab near its periphery.

In testimony whereof, I have signed this specification in the presence of two subscribing witnesses.

ALBERT P. LEE.

Witnesses:
B. H. RATHMANN,
CYRUS P. LEE.